United States Patent Office 2,981,593
Patented Apr. 25, 1961

---

2,981,593

PROCESS FOR RETAINING AND EXTRACTING URANIUM CONTAINED IN URANIFEROUS SOLUTIONS

Pierre Pagny, Villeneuve-la-Garenne, France, assignor to Potasse et Engrais Chimiques, Paris, France, a corporation of France No Drawing. Filed June 12, 1958, Ser. No. 741,450

Claims priority, application France July 30, 1957

4 Claims. (Cl. 23—14.5)

The present invention relates to a process for extracting uranium which is present as a dissolved salt in uraniferous solutions, especially in liquid effluents, from such solutions.

According to the invention, said process consists in putting the uraniferous solution, in a warm condition, in contact with an alkaline-earth phosphate, in a divided state, said phosphate having the property of adsorbing uranium, and thereafter separating the phosphate from the liquid phase.

Experiments have, in fact, revealed the unexpected effect that some alkaline-earth phosphates had the property of retaining under the form of an insoluble compound, the dissolved uranium, this phenomenon being observed even if the concentration of uranium in the solution is extremely low.

In the presence of phosphate particles, dissolved uranium precipitates and is retained on the periphery of said particles by a surface effect comparable to an adsorption.

The temperature which permits said adsorption phenomenon is substantially comprised between 60 and 90° C. according to the nature of the phosphate used.

The alkaline-earth phosphates which may be used according to the invention are preferably of the bi- or tribasic type. Among these phosphates, it is possible to mention bicalcium phosphate, tricalcium phosphate, calcium and barium double phosphate and calcium zinc and barium triple phosphate. The same property is likewise displayed by compounds derivable through partial hydrolysis of the above defined substances.

In a first embodiment of the invention, the alkaline-earth bi- or tribasic phosphate in a divided state, is first scattered by agitating through the uraniferous solution. Then, after an eventual decantation the thickened suspension formed by the phosphate particles having adsorbed uranium is filtered.

In a second embodiment of the invention, the phosphate suspension is prepared at first then it is mixed and stirred with the uraniferous solution. It is thereafter processed as in the first embodiment.

In both cases the proportions of phosphate used are preferably determined by the concentration of the solution in uranium, so as to determine the saturation of said phosphate, thereby producing a thick slurry constituted by adsorbent particles saturated with uranium.

In a third embodiment the solutions are passed in a warm condition through a filtering bed containing at least one tribasic alkaline-earth phosphate.

The invention further includes applications of the above specified process to the industrial recovery of residual uranium as present in filtrates derived from precipitation of uranium in tetravalent form (uranous precipitates) and in hexa- or octovalent form (uranyl salts, alkaline uranates, uranium peroxide and the like). Such precipitation is in fact performed commercially in uranium extracting processes, e.g. by addition of caustic soda or hydrogen peroxide to solutions of uranium salts or uranyl salts.

In particular sodium uranate and uranium peroxide are precipitated in this way and recovered in press filters or rotating filters. The filtrates essentially comprise sodium nitrate and soda in excess, or nitric acid, but still contain comparatively high proportions of dissolved uranium—e.g. from 10 to 30 milligrams per liter in the case of alkaline uranate filtrates, and as much as 500 milligrams per liter in that of uranium peroxide.

To minimize uranium losses and residual radioactivity in the effluent waste, the current practice is in some cases, to recover residual uranium by recycling the filtrate to predetermined stages in the process, but that seriously complicates the manufacture and increases its cost. In other cases, the precipitation is obtained by a coprecipitation, but the uranium is then lost.

By using the process of the invention for purifying of filtrates of the above-mentioned types, the difficulties just specified will be overcome in an especially desirable way as uranium concentrate is thereby obtained which can be treated as a rich ore, so that the uranium is thus restored into the conventional manufacturing cycle.

Further details will be given hereinafter in connection with the last-mentioned industrial application of the invention.

By way of performing the invention depends on the pH value of the solution.

First, this pH must not be lower than 3, or else the phosphates used for adsorbing would be dissolved.

Beyond pH 7 on the other hand, the selection of the particular phosphate also depends on the nature of the salts dissolved in the uraniferous solution.

*First case.*—The pH value is in the range of from 3 to 7.

If there is not a too high concentration in alkaline or alkaline-earth nitrates, the retention, by means of adsorption, of the uranium contained in uraniferous solutions with pH from 3 to 7 can be effected by bicalcium or tricalcium phosphate, which has a very low solubility and a high adsorbing capacity.

Other types of phosphates may likewise be suitable. For instance calcium and barium double phosphate, and calcium, zinc and barium triple phosphates may be used.

These compounds, though being more expensive than tricalcium phosphate, are advantageous due to their higher adsorbing capacity. Besides they allow a processing at lower temperature (60° C. instead of 90° C. in the case of tricalcium phosphate). Furthermore, they are suitable for processing effluents having a high concentration in salts, such as alkaline or alkaline-earth nitrates for instance.

Example 1

*Adsorption "in situ."*—A precipitate of calcium and barium double phosphate $Ca_2Ba(PO_4)_2$ is first formed by reaction of monoacidic calcium phosphate with barium carbonate:

$$2CaHPO_4, 2H_2O + BaCO_3 \rightarrow Ca_2Ba(PO_4)_2 + CO_2 + 5H_2O$$

The suspension is agitated and heated and it is maintained at the boiling temperature during about 30 minutes. At the end of this operation the pH value in the solution, which is about 5, is increased to 9 by adding ammonia in a concentrated solution. The resulting tribasic double phosphate is in the form of a very voluminous precipitate.

Ten liters of suspension of double calcium and barium phosphate containing 1,500 grams or double salt are prepared at first.

On the other hand 5,000 liters of uraniferous effluents originated from filtration of uranium peroxide containing 10.5 milligrams/liter are particularly neutralised up to pH 4.

After heating at 60° C. the above solution is mixed with the ten liters of suspension of double phosphate previously prepared and the mass is strongly stirred and this stirring is maintained during 15 minutes at 60° C. The uraniferous suspension obtained is filtered by means of a clarifier, of the pressure type having immersed frames provided with a filtering fabric.

After filtering, there is collected 500 grams of a damp precipitate containing 60% moisture and containing after drying 25% uranium. The filtrates contain less than 0.5 milligram uranium per liter.

*Example 2*

*Filtration on adsorbing bed.*—Twenty liters of a filtrate consisting of a solution of uranyl nitrate of which the pH is equal to 4 are filtered. The solution contains, per liter, 2.5 grams uranium, 3 grams 90% formic acid and 5 grams ammonium fluoride. The filtering bed is 40 millimeters deep. It comprises 180 grams tricalcium phosphate of which the particles are not greater than a few microns in diameter.

The resulting filtrates have a concentration of less than 3 milligrams per liter, whereas the uranium concentration in the precipitates from the upper surface to the bottom of the filtering bed, after drying, is about from 30% to 25%.

*Example 3*

2,500 grams dicalcium phosphate are suspended in 5,000 liters of uraniferous effluents having pH value of 6, containing 50 milligrams uranium per liter and previously heated at 80° C.

The suspension is agitated at 80° C. during 30 minutes and the uraniferous suspenison obtained thereafter is filtered by means of a clarifier of the pressure type having immersed frames provided with a filtering fabric.

After filtering there are collected 4,900 grams of a damp precipitate containing 57% moisture and containing after drying 11.5% uranium. The filtrates contain 1.5 milligrams uranium/liter.

*Second case.*—The pH of the solution is greater than 7. For performing adsorption "in situ," tricalcium phosphate cannot be used. But a double calcio-baritic phosphate is available.

*Example 4*

*Adsorption "in situ".*—500 grams of double calcium and barium phosphate (prepared as explained in Example 1) are suspended in 5,000 liters of alkaline uraniferous effluents (filtrate of sodium uranates of pH 12) containing 50 milligrams uranium per liter and previously heated at 60° C. The suspension is stirred at 60° C. during 15 minutes and the precipitate is thereafter decanted. The thickened suspension containing about 200 grams uraniferous phosphate per liter is then filtered by means of a vacuum filter.

After filtering 1,900 grams of damp uraniferous phosphate wtih 63% moisture are collected. The concentrate, after drying at 120° C., titrates 35.2% uranium. The liquid remaining after decanting contains only uranium traces (less than 0.2 milligram/liter).

In case of filtering through an active filtering bed, tricalcium phosphate may, on the contrary, still be used for retaining hexavalent uranium dissolved, provided that the uraniferous solution is free of carbonate ions.

In particular this is the case with alkaline uranate filtrates (sodium uranate and ammonium uranate) and those filtrates derived from precipitation of uranium peroxide. However the filtrates must be free of alkaline carbonates as otherwise the uranium adsorbed at the surface layer of phosphate would be progressively redissolved and adsorbed by the next adjacent layer, thereby resulting in a migration of the adsorbing layer through the filtering bed and rendering the filtering process inoperative.

If the basic uraniferous solution contains alkaline carbonates, the filtering beds using a triple phosphate or calcium, zinc and magnesium, and especially beds containing a double phosphate of calcium and barium, possess a remarkably high adsorbing capacity.

Thus a filtering bed comprising a tribasic double calcium and barium phosphate makes it possible to recover uranium as a 10% concentrate of uranium in terms of the dry concentrate, whereas the uranium concentration in the filtrate is less than 5 milligrams per liter.

The adsorbing power is not reduced by the presence of low amounts of oxygen peroxide and octavalent uranium can be adsorbed exactly in the same manner.

By way of comparison the adsorbing capacity of calcium and barium double phosphate with respect to carbonate solutions, is about twice as high as that of calcium, zinc and barium triple phosphate and ten times as high as that of tricalcium phosphate.

*Example 5*

*Filtering through an active bed.*—A suspension of double calcio-barytic phosphate is prepared by reaction in 4 liters water of 344 grams calcium phosphate and 216 grams barium carbonate (thus in excess of 10% over the stoichiometric proportions).

Said suspension is poured into a filtering funnel in small quantities at a time, so as to provide superimposed layers of filter material.

For example the quantity of phosphate used in terms of dry product may be about 70 grams in case of a filtering bed 35 millimeters deep.

20 liters of a solution containing 0.230 gram uranium, 2.5 grams anhydrous sodium carbonate and 0.5 cc. of 30 volumes per liter hydrogen peroxide are then filtered in vacuo in batches of 5 liters at a time.

The filtrates are found to analyze respectively 1.4, 0.6 and 4.3 and 2.4 milligrams uranium per liter for each of the five-liter batches filtered.

The uppermost layer of the filtrant substance (16 grams dry product) has an average uranium content of 11.1%. The intermediate layer (27 grams) contains 6.6% and the lowermost layer (31 grams) 2.85%.

In using the filtering bed the invention comprises mixing the phosphate used with a filtering carrier material such as diatomaceous earth, silica, fossil materials, cellulose (alfa grass foam) or a mixture of any such substances.

Such additions are made to the alkaline-earth phosphate suspension. The resulting mixture is homogenized by prolonged agitation and provides a filtering bed when subjected to filtering in vacuo.

The addition of filtering carriers has the two-fold advantage of assisting the filtering process and preventing formation of preferential paths through the filtering bed. The proportion of fossil silicates may amount to from 30 to 50% by weight of the mixture and the amount of cellulose to about 5% thereof.

In the commercial performance of the process, filtering columns may be used, which are filled with adsorbent material, or alternatively filters of any suitable type (press filters, rotary drum filters and the like).

When uranium is extrated by filtering through an active bed, the maximum efficiency is obtained by arranging in series two apparatus serially traversed by the uraniferous effluents. The filtering bed in the first unit will after some time have a high uranium content while the filtrate in the second unit has a minimum content.

When uranium is extracted by filtering through an acthe recovery plant while a fresh filtrating charge is received and the direction of flow of the unaniferous liquid is reversed.

Obviously the invention is not restricted to the forms of embodiment described and various variations may be made therein.

In particular, the filtering bed may comprise a mixture of tribasic phosphates, or again superimposed layers of different phosphates (e.g. the uppermost layer may comprise tricalcium phosphate and the lower layer calcium and barium phosphate).

I claim:

1. A process for an industrial and substantially complete recovery of uranium present in industrial uraniferous effluents in an ionized state, said effluents having a pH value at least equal to 3, said process comprising heating said effluents to a temperature of substantially 60° C., putting said warm effluents in contact with at least one phosphate in a divided state and selected from the group consisting of tribasic calcium and barium double phosphate, and tribasic calcium, zinc and barium triple phosphate, thereby obtaining by an adsorption phenomenon a uranium and alkaline earth phosphate, and thereafter separating said phosphate.

2. A process for an industrial and substantially complete recovery of uranium present in industrial uraniferous effluents in an ionized state, said effluents resulting from the precipitation and separation of one at least of the following salts: uranous salts, uranyl salts, alkaline uranates and uranium peroxide, said effluents having a pH value at least equal to 3, said process comprising heating said effluents to a temperature of substantially 60° C., putting said warm effluents in contact with at least one tribasic phosphate in a divided state and selected from the group consisting of calcium and barium double phosphate; calcium, zinc and barium triple phosphate, thereby obtaining by an adsorption phenomenon a uraniferous phosphate having a concentration in uranium similar to that of the rich uranium ores, and thereafter separating said uraniferous phosphate.

3. A process for an industrial and substantially complete recovery of uranium present in industrial uraniferous effluents in an ionized state, said effluents resulting from the precipitation of one of the following salts: uranous salts, uranyl salts, alkaline uranates and uranium peroxide, said effluents having a pH value at least equal to 3, said process comprising heating said effluents to a temperature of substantially 60° C., preparing a precipitate of a double calcium and barium tribasic phosphate by heating a suspension of barium carbonate and calcium phosphate with subsequent addition of ammonia up to a pH of about 9, mixing said precipitate with said heated effluents, thereby obtaining by an adsorption phenomenon a uraniferous phosphate, and thereafter separating said uraniferous phosphate.

4. A process for an industrial and substantially complete recovery of uranium present in industrial uraniferous effluents in an ionized state, said effluents having a pH value substantially comprised between 8 and 12, with an eventual presence of alkaline carbonates, said process comprising heating said effluents to a temperature of substantially 60° C., putting said warm effluents in contact with at least one tribasic phosphate in a divided state selected from the group consisting of calcium and barium double phosphate; calcium, zinc and barium triple phosphate, thereby obtaining by an adsorption phenomenon a uraniferous phosphate, and thereafter separating said uraniferous phosphate.

References Cited in the file of this patent

UNITED STATES PATENTS 2,885,258    Bain ------------------ May 5, 1949

OTHER REFERENCES

Newman et al.: J. of Biological Chemistry, vol. 179 (1949), pp. 325–348. (Copy in Scientific Library.)

Perry: Chemical Engineers' Handbook (1950), pp. 886–916, McGraw-Hill Book Co., Inc., New York. (Copy in Scientific Library.)

Perry: Chemical Engineers' Handbook (1950), pp. 969–970, McGraw-Hill Book Co., Inc., New York. (Copy in Scientific Library.)

Seaborg et al.: The Actinide Elements (1954), pages 143–145 and 162, McGraw-Hill Book Co., Inc., New York. (Copy in Scientific Library.)